US005745782A

United States Patent [19]
Conway

[11] Patent Number: 5,745,782
[45] Date of Patent: Apr. 28, 1998

[54] METHOD AND SYSTEM FOR ORGANIZING AND PRESENTING AUDIO/VISUAL INFORMATION

[75] Inventor: Lynn Conway, Ann Arbor, Mich.

[73] Assignee: Regents of the University of Michigan, Ann Arbor, Mich.

[21] Appl. No.: 674,981

[22] Filed: Jul. 3, 1996

Related U.S. Application Data

[63] Continuation of Ser. No. 127,809, Sep. 28, 1993, abandoned.

[51] Int. Cl.$^6$ ........................................... G06F 17/21
[52] U.S. Cl. ................................. 395/806; 395/762
[58] Field of Search ........................... 395/762, 773, 395/778, 806, 807, 339, 348–349, 335; 434/307 R

[56] References Cited

U.S. PATENT DOCUMENTS

| | | | |
|---|---|---|---|
| 4,386,379 | 5/1983 | Smith et al. | 360/72.3 |
| 4,689,022 | 8/1987 | Peers et al. | 434/307 |
| 4,858,033 | 8/1989 | Chippendale | 360/14.2 |
| 4,899,292 | 2/1990 | Montagna et al. | 395/762 |
| 4,933,880 | 6/1990 | Borgendale et al. | 395/762 X |
| 4,970,678 | 11/1990 | Sladowski et al. | 395/762 X |
| 4,994,987 | 2/1991 | Baldwin . | |
| 5,012,333 | 4/1991 | Etra . | |
| 5,065,251 | 11/1991 | Shuhart, Jr. et al. | 358/335 |
| 5,101,364 | 3/1992 | Davenport et al. | 395/152 |
| 5,109,482 | 4/1992 | Bohrman | 395/154 |
| 5,142,662 | 8/1992 | Gump et al. | 395/100 |
| 5,177,645 | 1/1993 | Lemelson | 360/35.1 |
| 5,237,648 | 8/1993 | Mills et al. | 395/133 |
| 5,241,671 | 8/1993 | Reed et al. . | |
| 5,297,249 | 3/1994 | Bernstein et al. | 395/156 |
| 5,307,456 | 4/1994 | MacKay | 395/154 |
| 5,367,621 | 11/1994 | Cohen et al. | 395/772 X |
| 5,432,904 | 7/1995 | Wong | 395/762 X |
| 5,440,678 | 8/1995 | Eisen et al. | 395/806 X |
| 5,481,666 | 1/1996 | Nguyen et al. | 395/762 X |

OTHER PUBLICATIONS

Degen et al. "Working with Audio: Integrating Personal Tape Recorder's & Desktop Computers", Procedures of '92 Conference on Human Factors in Computer Systems, May 3–7, 1992.
Teacher's Guide, Media Text, MacIntosh "Wings for Learning", 1992, pp. 1–79.
Voice Impact Pro, Voice Record publication.

*Primary Examiner*—Joseph H. Feild
*Attorney, Agent, or Firm*—Brooks & Kushman P.C.

[57] ABSTRACT

A method and system is disclosed for storing media identification data in a file using a digital computer in communication with a media presentation system. The method includes the step of receiving at the digital computer a signal indicating a command to position a marker within the file. The method also includes the step of presenting audio/visual information at the media presentation system. The method further includes the step of receiving a signal indicating a relationship between the position of the marker and the presented audio/visual information. In addition, the method includes the step of transmitting a signal indicating a request for media identification data and the step of transmitting a signal representing the media identification data. The method finally includes the step of storing the media identification data in the file at the position of the marker.

20 Claims, 7 Drawing Sheets

METHOD AND SYSTEM FOR ORGANIZING AND PRESENTING AUDIO/VISUAL INFORMATION

This application is a continuation of application Ser. No. 08/127,809 filed on Sep. 28, 1993, abandoned.

TECHNICAL FIELD

This invention relates generally to methods and systems for accessing media using a computer. In particular, this invention relates to methods and systems for using a digital computer and a media presentation system to organize and present audio/visual information.

BACKGROUND ART

Effective presentations are important in many fields including business, education and entertainment. Presentations can be live or recorded.

Although some live presentations rely solely on the verbal skills of a speaker, many speakers choose to enhance their presentations by incorporating audio/visual aids. Audio/visual aids are often used to maintain the attention of an audience. In addition, it is widely believed that audio/visual aids, when properly used, increase the effectiveness of a presentation.

Audio aids used in presentations include background music, sound effects and spoken word recordings. Audio aids can be preserved on media including magnetic tape, phono-records, and digital compact discs. Visual aids used in presentations include charts, still pictures and motion pictures. visual aids can be preserved on media including magnetic tape, film and laser discs.

The effective use of audio/visual aids requires the speaker to be able to access the media in an efficient and timely fashion. If the media cannot be easily accessed or if the media cannot be presented in a timely fashion, use of the audio/visual aids will detract from the quality and effectiveness of the presentation.

Due to a variety of factors, it is advantageous if the speaker can remain flexible enough to adjust the content, scope or duration of a presentation while the presentation is being delivered. Audience reaction, for example, might prompt the speaker to adjust the focus of a presentation. Similarly, unforeseen delays or interruptions could force the speaker to reduce the length of a presentation.

Fine tuning a presentation while it is being delivered often affects the use of audio/visual aids employed by the speaker. For example, the speaker may find it necessary to eliminate an audio/visual aid to conserve time. The speaker may wish to re-display a visual aid or present audio/visual aids out of sequence. The speaker may wish to present an audio/visual aid which relates to material outside the scope of prepared remarks.

Therefore, in order to accommodate the flexibility required of a speaker delivering a presentation, attempts have been made to provide a speaker with a mechanism for identifying and organizing audio/visual aids. The identified audio/visual aids could then be accessed directly without being restricted to a prepared sequence.

Some prior art devices have attempted to provide a system which permits a speaker to access and display stored images. For example, U.S. Pat. No. 4,994,987, Baldwin, discloses a device which allows a speaker to present images which are identified using machine readable image access documents.

A common embodiment of Baldwin employs a laser bar code reader for identifying image access documents. Each image access document typically includes the image and a bar code identifier.

Because of its shortcomings, this attempt met with limited success. A first shortcoming is the time required to prepare for a presentation. The system of Baldwin requires the speaker to create an image access document for each image to be presented. Each image access document contains, in machine readable form, either the image information itself or image access information.

Producing the required image access documents in preparation for a presentation is time consuming. To many speakers, this time commitment is undesirable.

A second shortcoming of the Baldwin system is the cumbersome nature of the user interface. The system not only requires a document reader, but also requires the speaker to physically keep track of each image access document.

Although images can theoretically be presented out of sequence, physically searching through a large number of image access documents for a specific image can prove difficult for the speaker and distracting to the audience. Consequently, the flexibility provided to the speaker using the system of Baldwin decreases as a function of the number of images to be presented.

Other prior art approaches include U.S. Pat. No. 5,012,334, Etra, in which a video image bank system is disclosed. Etra describes a system for accessing stored and indexed video motion picture image sequences. While this system provides flexibility in the production of video presentations, like Baldwin, the user interface is too cumbersome to use during a live presentation. In addition, the system limits the user to video sequences which are indexed.

Yet another prior art approach is MediaText, a software product distributed by Constructive Instruments, Inc. MediaText is a word processing oriented application which permits a user to create and access links to media. The application uses a split-screen display having a "text area" in which the user may perform typical word processing and a "media margin" in which the user may create and access links to a variety of media.

Like other prior art approaches, MediaText requires significant user preparation in order to create the media links. In addition, the media links in the media margin are not associated with specific text in the text area. The media links are only related to the general proximity of any associated text.

Other presentation packages are commercially available which take advantage of Hyper Card design and programming tools and techniques. Although these packages provide a programmer with the facility to create user selectable buttons, they result in canned applications which can only be modified by a skilled Hyper Card programmer.

In summary, the prior art methods and systems have the following shortcomings:

1) They require extensive user preparation to identify audio/visual information to be used in a presentation.

2) Their performance is biased in favor of sequentially accessing identified audio/visual information.

3) They fail to associate audio/visual information with a specific part of a presentation.

In view of the prior art, there is a need to develop an efficient and easy to use means of organizing and presenting audio/visual information associated with a specific portion of a verbal presentation that overcomes the above shortcomings.

The need for flexibility regarding content, scope and duration is not limited to live presentations. It would also be advantageous provide similar flexibility for recorded presentations. Unfortunately, due to their nature, recorded presentations are almost completely inflexible.

Examples of the need for flexibility in recorded presentations are numerous, particularly regarding scope and content. A student viewing an educational video, for example, might want additional information regarding particular topics covered in the presentation. A consumer viewing a home shopping presentation might want product information regarding a displayed item. A radio listener might want information regarding a song such as the title or the artist.

There is, therefore, a need to develop an efficient and easy to use means of providing an audience with the ability to identify and present information associated with presented audio/visual information.

SUMMARY OF THE INVENTION

A first aspect of the present invention described and disclosed herein comprises a method and system for storing media identification data in a file using a digital computer in communication with a media presentation system. The media identification data identifies audio/visual information presented by the media presentation system.

It is an object of the present invention to provide an easy to use method and system for associating audio/visual information and text.

It is an object of the present invention to provide an efficient method and system for storing media identification data in a file wherein the media identification data is stored within the file based on a position of a marker.

It is another object of the present invention to provide a method and system for storing media identification data in a file wherein the media identification data is received from the media presentation system.

In carrying out the above objects and other objects of the present invention, a first method is provided for storing media identification data in a file using a digital computer in communication with a media presentation system. The media presentation system includes a media storage device and a media presentation device.

A media storage device is a device for storing media data representing audio/visual information. A media presentation device is a device for presenting audio/visual information.

The method of the present invention includes the step of receiving at the digital computer a signal indicating a command to position a marker within the file. As used herein, the term marker refers to a position indicator which does not need to be displayed. If displayed, a marker may take the form of a text cursor, a graphical pointer or any other position indication.

The method also includes the step of presenting audio/visual information to the media presentation device. In a preferred embodiment, this step includes receiving at the media presentation system a signal indicating a command to identify audio/visual information stored at the media storage device. The method also includes the step of receiving at the digital computer a signal indicating a relationship between the position of the marker and the identified audio/visual information.

The method further includes the step of transmitting from the digital computer to the media presentation system a signal indicating a request for the media identification data to identify the presented audio/visual information. In a preferred embodiment, the identification data could be a physical or logical address at the media storage device of the data representing the presented audio/visual information.

The method next includes the step of transmitting from the media presentation system to the digital computer a signal representing the identification data. The method finally includes the step of storing the media identification data at the position of the marker within the file.

A second aspect of the present invention described and disclosed herein comprises a method and system for presenting audio/visual information identified by media identification data using a media presentation system in communication with a digital computer.

It is an object of the present invention to provide an easy to use method and system for presenting audio/visual information associated with specific text.

It is an object of the present invention to provide a method and system for presenting audio/visual information wherein the media data representing the audio/visual information is identified by media identification data which is stored within a file at a position of a marker.

In carrying out the above objects and other objects of the present invention, a second method is provided for presenting audio/visual information identified by media identification data using a media presentation system in communication with a digital computer. The media presentation system includes a media storage device and a media presentation device.

The method of the present invention includes the step of receiving at the digital computer a signal indicating a command to position a marker within a file. The method also includes the step of receiving at the digital computer a signal indicating a command to present the audio/visual information identified by the media identification data stored at the position of the marker.

In addition, the method includes the step of extracting the media identification data stored at the position of the marker to locate media data stored at the media storage device. The media data represents the identified audio/visual information.

The method further includes the step of transmitting from the digital computer to the media presentation system a signal representing the media identification data. The method finally includes the step of presenting at the media presentation device the audio/visual information based on the media identification data.

A third aspect of the present invention described and disclosed herein comprises a method and system for presenting information associated with audio/visual information identified by media identification data using a media presentation system in communication with a digital computer.

It is an object of the present invention to provide a method and system for presenting information associated with audio/visual information wherein the audio/visual information is identified by media identification data which is stored within a file at a position of a marker.

In carrying out the above object and other objects of the present invention, a third method is provided for presenting information associated with audio/visual information identified by media identification data using a media presentation system in communication with a digital computer. The media presentation system includes a media storage device and a media presentation device.

The method of the present invention includes the step of receiving at the digital computer a signal indicating a command to position a marker within a file. The method also includes the step of receiving at the digital computer a signal indicating a command to present the information associated with the audio/visual information identified by the media identification data stored at the position of the marker.

In addition, the method includes the step of extracting the media identification data stored at the position of the marker to identify the audio/visual information. The method further includes the step of transmitting from the digital computer to the media presentation system a signal representing the media identification data.

The method next includes the step of processing the media identification data. The method finally includes the step of presenting the information based on the media identification data.

In further carrying out the above objects and other objects of the present invention, systems are also provided for carrying out the steps of the above described methods.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
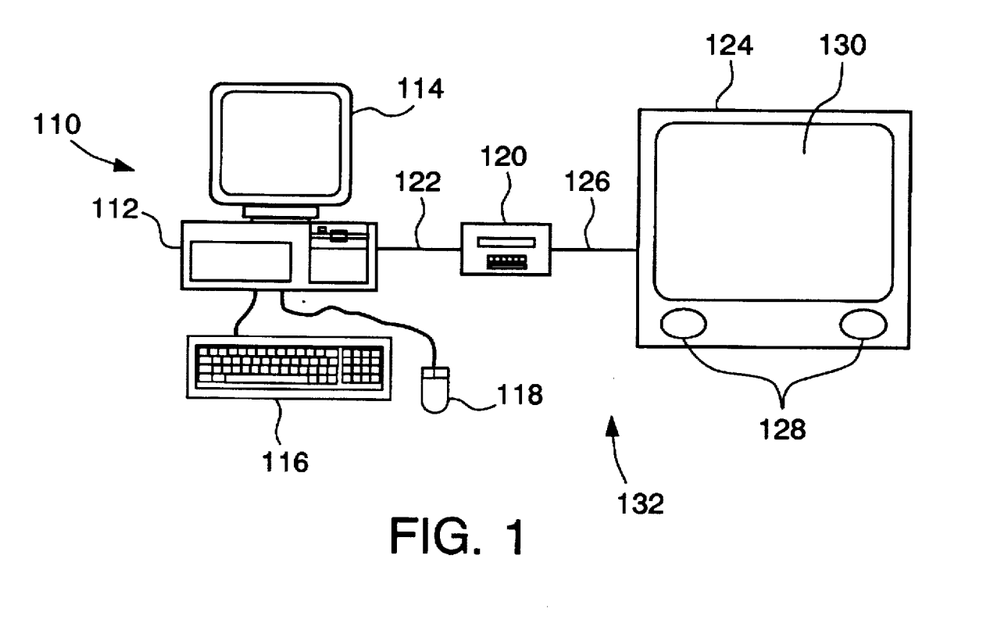
FIG. 1 is a schematic view showing a typical hardware configuration in accordance with the present invention.

Referring now to the drawing figures, there is illustrated in FIG. 1 a personal computer chassis 112, a display screen 114, a keyboard 116 and a mouse 118, connected in typical fashion and generally referred to as a computer workstation 110. In addition, there is illustrated a laser disc player 120 connected to television monitor 124 via cable 126, generally referred to as a media presentation system 132.

The laser disc player 120 provides signals to the television monitor 124 via cable 126. Sounds are presented through speakers 128 and images are presented on screen 130. Cable 122 provides two-way communication between the computer workstation 110 and the laser disc player 120 of the media presentation system 132. Commands and inquiries are carried from the computer workstation 110 to the laser disc player 120, and responses and data are carried in the opposite direction.

Figure 2A:
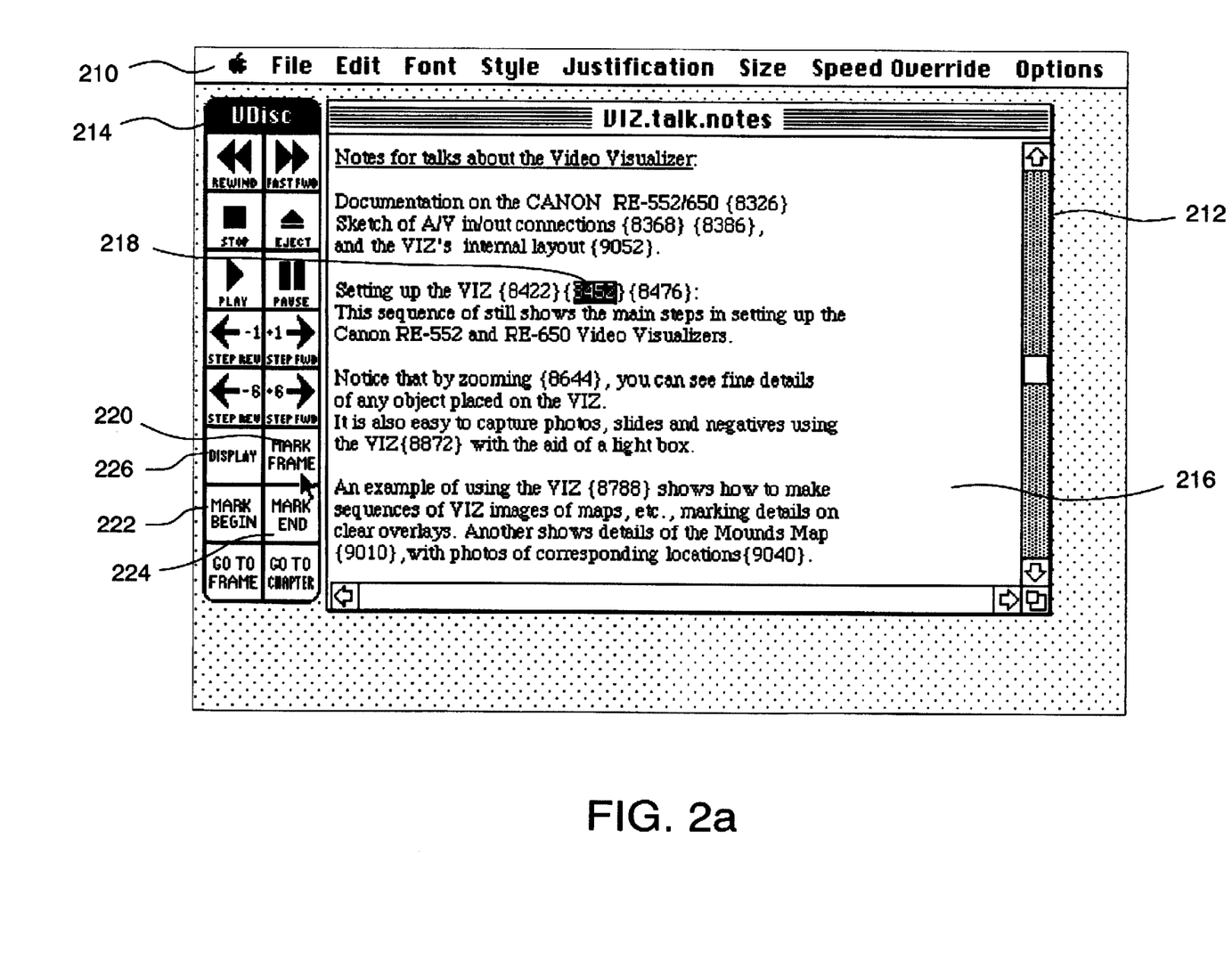
FIG. 2a is a screen display illustrating a user interface in accordance with the present invention.

Referring to FIG. 2a, a screen display is illustrated. The screen display is generated by software implemented on computer workstation 110 and is displayed on the display screen 114. The software provides a user interface for controlling the laser disc player 120, for storing media identification data in a file and for presenting sequences on the laser disc player 120 based on the stored media identification data. The screen includes a menu bar 210, an edit window 212 and a media device remote control window 214.

The purpose of the edit window 212 is to permit a user to edit the contents of a file. The edit window 212 includes a title bar, vertical and horizontal scroll bars, a size button and a work area 216 typically found in computer applications.

As shown, the edit window 212 displays notes for a talk, with media identification data embedded at appropriate location in the notes. In this case, the media identification data represents frame numbers for audio/visual information on a videodisc. One of the frame numbers (8452), has been selected for presentation of the corresponding audio/visual information.

The frame numbers, such as (8452), were initially placed at cursor locations in the file by locating the corresponding audio/visual information using the soft buttons of the media device remote control window 214 or the hardware control buttons of the video disc player 120 and then pressing the MARK FRAME button 220.

The work area 216 displays the contents of a file including media identification data 218 which is designated by surrounding braces. The contents of the file displayed in the work area 216 can be edited using the keyboard 116 or the mouse 118 in conjunction with the MARK FRAME button 220, the MARK BEGIN button 222 and the MARK END button 224 of the remote control window 214.

The remote control window 214 includes a number of buttons for controlling the laser disc player 120. The REWIND, FAST FWD, STOP, EJECT, PLAY, PAUSE, STEP REV −1, STEP FWD +1, STEP REV −6, STEP FWD +6, GO TO FRAME and GO TO CHAPTER buttons perform standard functions of laser disc player 120.

The MARK FRAME button 220, the MARK BEGIN button 222 and the MARK END button 224 are used to store media identification data in the file displayed in the work area 216. The media identification data is stored at the position of the cursor. Pressing the MARK FRAME button 220 permits the user to store media identification data relating to a single frame at the position of the cursor.

Pressing the MARK BEGIN button 222 permits the user to identify the first frame of a sequence of frames. Pressing the MARK END button 224 permits the user to identify the last frame in the sequence of frames and store media identification data relating to the sequence of frames at the position of the cursor.

If the cursor is positioned at media identification data 218 as shown in FIG. 2, pressing the DISPLAY button 226 permits the user to display the frame identified by the media identification data 218. In the preferred embodiment, the media identification data 218 is the ASCII representation of a frame number of the media. Therefore, pressing the DISPLAY button 226 would cause frame number (8452) to be displayed on the television monitor 124.

Figure 2B:
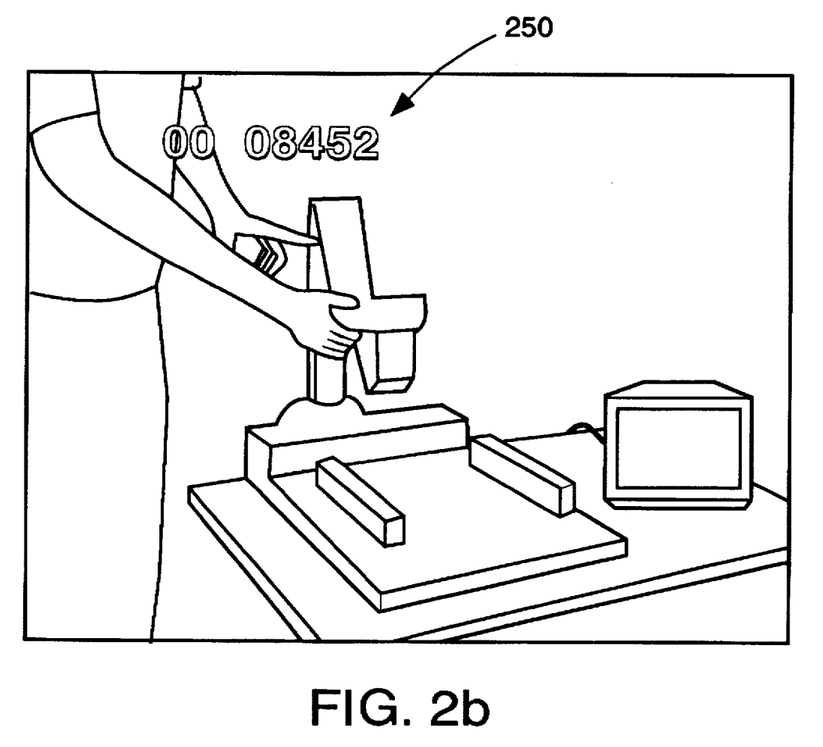
FIG. 2b is a display of audio/visual information based on selected media identification data.

Referring now to FIG. 2b, a display of audio/visual information is illustrated. The display is presented on television monitor 124 and includes a frame number 250 which can be used to identify the display. As shown, this screen display is identified as frame number (8452), and this screen display would result from either of two reciprocal uses—storing media identification data or presenting audio/visual information.

Prior to storing media identification data in a file, the user must identify the frame or series of frames to which the media identification data relates. In the preferred embodiment, this is accomplished by displaying the desired frame prior to pressing the MARK FRAME button 220. This method would result in television monitor 124 displaying the desired frame as illustrated in FIG. 2b.

Another use of the preferred embodiment of the present invention which would result in the display illustrated in FIG. 2b is presenting audio/visual information. To accomplish this, a user would position the marker on the media identification data representing the desired audio/visual information and select the media identification data as shown in FIG. 2a. Pressing the DISPLAY button 226 would cause the frame identified by the selected media identification data to be displayed on television monitor 124 as shown in FIG. 2b.

Figure 3A:
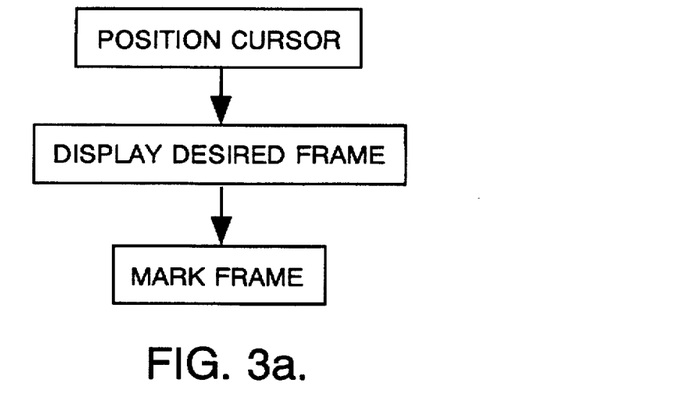
FIG. 3a is a block diagram illustrating the steps required for a user to store identification data in accordance with the present invention.

FIG. 3a illustrates the steps required for a user to use the preferred embodiment to store identification data for a single laser disc frame in a file at the position of the cursor. First, the user must use the keyboard 116 or the mouse 118 to position the cursor at the desired position within the work area 216. Next, the user must position the head of the laser disc player 120 at the desired frame. The user may accomplish this using the buttons of the remote control window 214 or using the controls of the laser disc player 120.

Finally, the user must press the MARK FRAME button 220 in the remote control window 214. This causes media identification data pertaining to the current frame of the laser disc player 120 to be stored at the current position of the cursor.

Figure 3B:
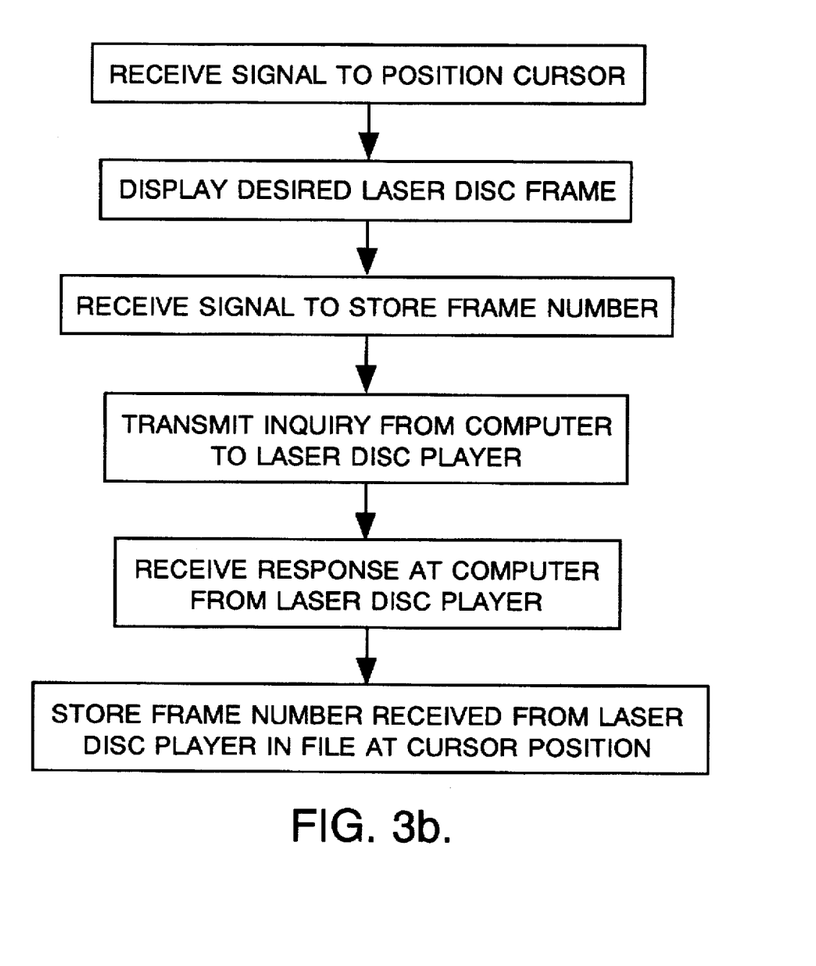
FIG. 3b is a functional block diagram illustrating the method steps required to store identification data in accordance with the present invention.

FIG. 3b illustrates the method of the present invention which provides the functionality described above. The first step is to receive a signal at the computer workstation 110 to position the cursor within the file. The second step is to display the desired frame based on signals received at the laser disc player 120.

The next step is to receive a signal indicating the user's desire to store the displayed frame number at the current position of the cursor. An inquiry is then transmitted from the computer workstation 110 to the laser disc player 120 to obtain the frame number.

A response to the inquiry is transmitted from the laser disc player 120 to the computer workstation 110. The response including identification data such as a frame number. Finally, the frame number is stored in ASCII format surrounded by braces at the position of the cursor.

Figure 4A:
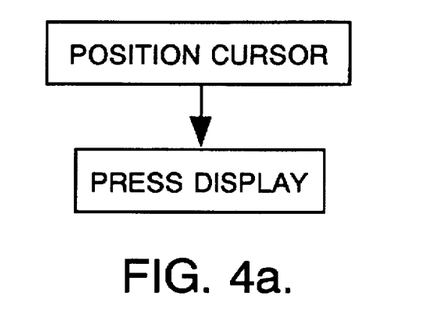
FIG. 4a is a block diagram illustrating the steps required for a user to present media based on identification data in accordance with the present invention.

FIG. 4a illustrates the steps required for a user to use the preferred embodiment to display a single laser disc frame based on the identification data stored in a file at the position of the cursor. First, the user must use the keyboard 116 or the mouse 118 to position the cursor at the desired position within the work area 216.

Finally, the user must press the DISPLAY FRAME button 226 in the remote control window 214. This causes laser disc player 120 to display the frame identified by the media identification data stored at the current position of the cursor.

Figure 4B:
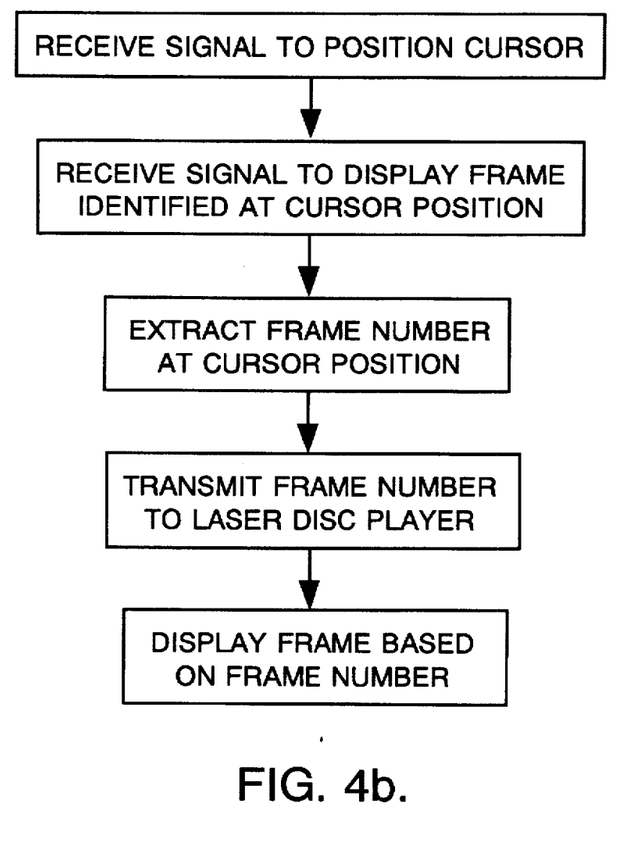
FIG. 4b is a functional block diagram illustrating the method steps required to present media based on identification data in accordance with the present invention.

FIG. 4b illustrates the method of the present invention which provides the functionality described above. The first step is to receive a signal at the computer workstation 110 to position the cursor within the file. The second step is to receive a signal indicating the user's desire to display the frame identified by the media identification data stored at the current position of the cursor.

The next step is to extract the media identification data stored at the current position of the cursor. The media identification data is then transmitted from the computer workstation 110 to the laser disc player 120. Finally, the laser disc player 120 displays the frame corresponding to the frame number stored in ASCII format at the position of the cursor.

Although the preferred embodiment has been described above in connection with a laser disc player, the invention is compatible with Photo CD players, CD-ROM players, Video Floppy disks, Digital Audio Tape players, Video Tape players as well as a number of other commercially available media storage devices regardless of whether they are based on digital or analog technology.

In addition to being capable of supporting a variety of different media storage devices, it is possible for the invention to support multiple devices simultaneously. In such a situation, the media identification data stored in the file would include an indication of the relevant media storage device.

It should also be noted that while the television monitor 124 and the display screen 114 are distinct in the preferred embodiment, it is possible that a single monitor replace the two. The single monitor would be shared by the computer workstation and the media presentation system 132.

Figure 5:
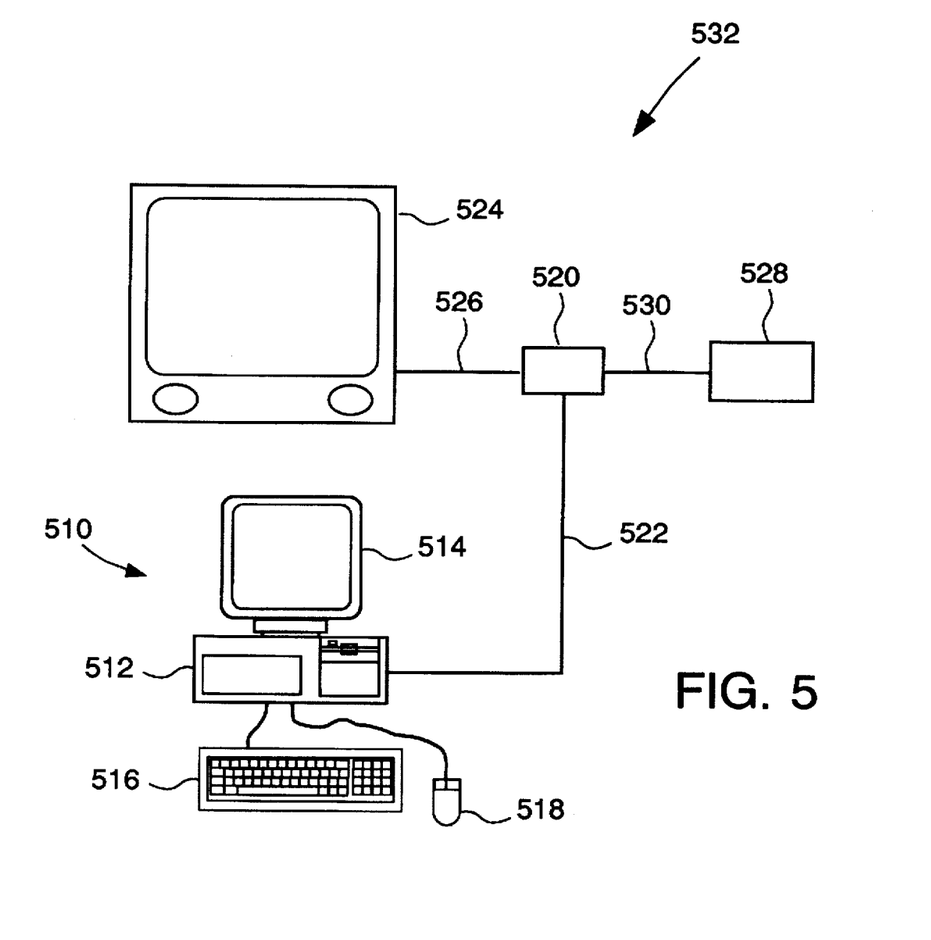
FIG. 5 is a schematic view showing a second hardware configuration in accordance with the present invention.

Referring now to FIG. 5, there is illustrated a second hardware configuration including a personal computer chassis 512, a display screen 514, a keyboard 516 and a mouse 518, connected in typical fashion and generally referred to as a computer workstation 510. The computer workstation 510 is capable of executing software having a user interface as illustrated in FIG. 2.

In addition, there is illustrated a cable television interface 520 connected to television monitor 524 via cable 526. The cable television interface 520 is also connected to cable broadcasting station 528 via cable 530.

Cable broadcasting station 528, cable television interface 520 and television monitor 524 are part of a cable television system generally referred to by reference numeral 532. Computer workstation 510 and cable television system 532 are connected for two-way communication by cable 522. Commands and inquiries are carried from computer workstation 510 to cable television system 532, and responses and data are carried in the opposite direction.

Figure 6A:
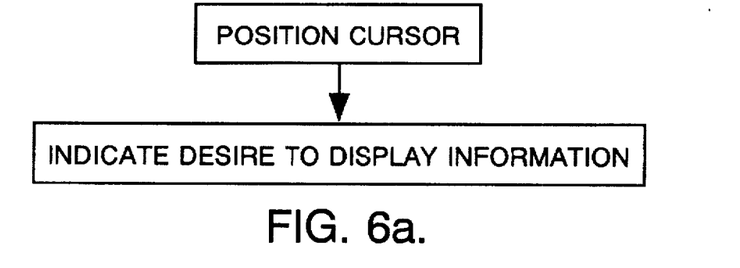
FIG. 6a is a block diagram illustrating the steps required for a user to present information regarding media identified by media identification data in accordance with the present invention.

FIG. 6a illustrates the steps required for a user to use the hardware of FIG. 5 to display information associated with media identified by media identification data stored in a file at the position of the cursor. First, the user must use the keyboard 516 or the mouse 518 to position the cursor at the desired position within the work area 216.

Finally, the user must press the DISPLAY FRAME button 226 in the remote control window 214. In the preferred embodiment, this causes computer workstation 510 to display information associated with the media identified by the media identification data stored at the current position of the cursor.

The displayed information is preferably stored at the cable broadcasting station 528 and transmitted to the computer workstation 510 for display on monitor 514. Other embodiments, however, may store the information at a different location such as locally at the computer workstation 510.

Figure 6B:
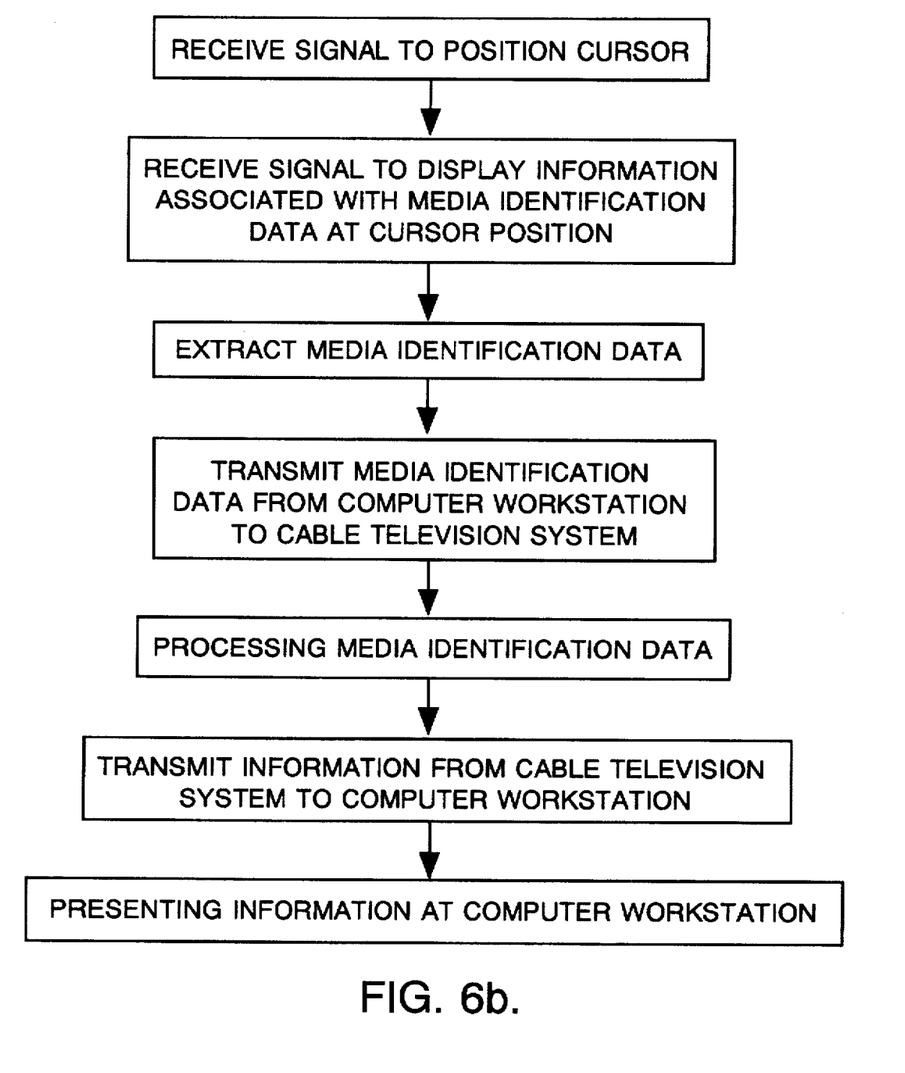
FIG. 6b is a functional block diagram illustrating the method steps required to present information regarding media identified by media identification data in accordance with the present invention.

FIG. 6b illustrates the method of the present invention which provides the functionality described above. The first step is to receive a signal at the computer workstation 510 to position the cursor within the file. The second step is to receive a signal indicating the user's desire to display information associated with the media identified by the media identification data stored at the current position of the cursor.

The next step is to extract the media identification data stored at the current position of the cursor. The media identification data is then transmitted from the computer workstation 510 to the cable television system 532. The cable television system 532 processes the media identification data, preferably at the cable broadcasting station 528, to determine the information to be presented.

Next the cable broadcasting station transmits the information for presentation. Finally, the computer workstation 510 displays the information associated with the media identification data stored in ASCII format at the position of the cursor.

Although the preferred embodiments have been described such that the information is ultimately displayed at the computer workstation 510, it is also possible to display the information on television monitor 524. Likewise, it should be noted that the processing which is described to occur at the cable broadcasting station 528 could occur elsewhere such as at the computer workstation 510.

Although the best mode for carrying out the invention has been described in detail, those familiar with the art to which this invention relates will recognize various alternative designs and embodiments for practicing the invention as defined by the following claims.

What is claimed is:

1. A method for organizing media identification data in a text-based document file within a digital computer, the media identification data indicative of locations of desired information stored on a media storage device within a media presentation system in communication with the digital computer, the media presentation system including a media presentation device, the method including the steps of:

receiving at the digital computer a signal indicating a command to position a marker within a desired text area of the file;

presenting audio/visual information at the media presentation device;

receiving at the digital computer an operator selection signal associating the position of the marker with the presented audio/visual information;

automatically transmitting from the digital computer to the media presentation system a request signal indicating a request for the media identification data based on the operator selection signal, the media identification data identifying the presented audio/visual information;

automatically transmitting from the media presentation system to the digital computer a signal representing the media identification data based on the request signal; and automatically storing the media identification data at the position of the marker within the desired text area of the file wherein an address of the presented audio/visual information is automatically placed at the desired text area in response to operator selection of the presented audio/visual information.

2. The method as claimed in claim 1 wherein the media identification data is a physical address of the media storage device identifying the location of data representing the presented audio/visual information on the media storage device.

3. The method as claimed in claim 1 wherein the step of presenting includes the step of receiving at the digital computer a signal indicating a command to identify media data stored at the media storage device.

4. A method for presenting audio/visual information identified by media identification data using a media presentation system in communication with a digital computer, the media identification data indicative of addressable locations of desired information stored on a media storage device within a media presentation system in communication with the digital computer, the media presentation system including a media presentation device, the method including the steps of:

receiving at the digital computer a signal indicating a command to position a marker within a desired text area of a file;

receiving at the digital computer a signal indicating a command to present the audio/visual information identified by the media identification data automatically stored at the position of the marker in response to earlier operator selection of the audio/visual information;

extracting the media identification data stored at the position of the marker to address media data stored at the media storage device, the media data representing the identified audio/visual information;

transmitting from the digital computer to the media presentation system an address signal representing the media identification data; and presenting the audio/visual information at the media presentation device based on the media identification data.

5. The method as claimed in claim 4 wherein the media identification data is a physical address of the media storage device identifying the location of data representing the presented audio/visual information on the media storage device.

6. A method for presenting related information associated with a presentation of audio/visual information on a media presentation system in communication with a digital computer, the media presentation system including a media presentation device, the method including the steps of:

receiving at the digital computer a signal indicating a command to position a marker within a desired text area of a file;

receiving at the digital computer a signal indicating a command to present the related information associated with the presentation of the audio/visual information identified by media identification data automatically stored at the position of the marker in response to earlier operator selection of the audio/visual information, the media identification data indicative of addressable locations of desired information stored on a media storage device within the media presentation system;

extracting the media identification data stored at the position of the marker to address media data stored at the media storage device, the media data representing the audio/visual information;

transmitting from the digital computer to the media presentation device an address signal representing the media identification data;

identifying the related information based on the media identification data; and presenting the related information.

7. The method of claim 6 wherein the step of identifying is performed at the digital computer.

8. The method of claim 6 wherein the step of identifying is performed at the media presentation device.

9. The method of claim 6 wherein the step of presenting is performed at the media presentation device.

10. The method of claim 6 wherein the step of presenting is performed at a display device connected to the digital computer.

11. A system for organizing media identification data in a text-based document file within a digital computer, the media identification data indicative of locations of desired information stored on a media storage device within a media presentation system in communication with the digital computer, the media presentation system including a media presentation device, the system including:

means for receiving at the digital computer a signal indicating a command to position a marker within a desired text area of the file;

means for presenting audio/visual information at the media presentation device;

means for receiving at the digital computer an operator selection signal associating the position of the marker with the presented audio/visual information;

means for automatically transmitting from the digital computer to the media presentation system a request signal indicating a request for the media identification data based on the operator selection signal, the media identification data identify the presented audio/visual information;

means for automatically transmitting from the media presentation system to the digital computer a signal representing the media identification data based on the request signal; and means for automatically storing the media identification data at the position of the marker within the desired text area of the file wherein an address of the presented audio/visual information is automatically placed at the desired text area in response to operator selection of the presented audio/visual information.

12. The system as claimed in claim 11 wherein the media identification data is a physical address of the media storage device identifying the location of data representing the presented audio/visual information on the media storage device.

13. The system as claimed in claim 11 wherein the means for presenting includes means for receiving at the media presentation system a signal indicating a command to identify media data stored at the media storage device.

14. A system for presenting audio/visual information identified by media identification data using a media presentation system in communication with a digital computer, the media identification data indicative of addressable locations of desired information stored on a media storage device within a media presentation system in communication with the digital computer, the media presentation system including a media presentation device, the system including:

means for receiving at the digital computer a signal indicating a command to position a marker within a desired text area of a file;

means for receiving at the digital computer a signal indicating a command to present the audio/visual information identified by the media identification data automatically stored at the position of the marker in response to earlier operator selection of the audio/visual information;

means for extracting the media identification data stored at the position of the marker to address media data stored at the media storage device, the media data representing the identified audio/visual information;

means for transmitting from the digital computer to the media presentation system an address signal representing the media identification data; and means for presenting the audio/visual information at the media presentation device based on the media identification data.

15. The system as claimed in claim 14 wherein the media identification data is a physical address of the media storage device identifying the location of data representing the presented audio/visual information on the media storage device.

16. A system for presenting related information associated with a presentation of audio/visual information on a media presentation system in communication with a digital computer, the media presentation system including a media presentation device, the system including:

means for receiving at the digital computer a signal indicating a command to position a marker within a desired text area of a file;

means for receiving at the digital computer a signal indicating a command to present the related information associated with the presentation of the audio/visual information identified by media identification data automatically stored at the position of the marker in response to earlier operator selection of the audio/visual information, the media identification data indicative of addressable locations of desired information stored on a media storage device within the media presentation system;

means for extracting the media identification data stored at the position of the marker to address media data stored at the media storage device, the media data representing the audio/visual information;

means for transmitting from the digital computer to the media presentation device an address signal representing the media identification data;

means for identifying the related information based on the media identification data; and means for presenting the related information.

17. The system of claim 16 wherein the means for identifying is the digital computer.

18. The system of claim 16 wherein the means for identifying is the media presentation system.

19. The method of claim 16 wherein the means for presenting is performed at the media presentation device.

20. The system of claim 16 wherein the means for presenting is a display device connected to the digital computer.

* * * * *